(12) United States Patent
Xu (10) Patent No.: US 10,198,180 B2
(45) Date of Patent: Feb. 5, 2019

(54) METHOD AND APPARATUS FOR MANAGING STORAGE DEVICE

(71) Applicant: Tencent Technology (Shenzhen) Company Limited, Shenzhen, Guangdong (CN)

(72) Inventor: Hao Xu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 15/707,860

(22) Filed: Sep. 18, 2017

(65) Prior Publication Data

US 2018/0004409 A1  Jan. 4, 2018

Related U.S. Application Data

(63) Continuation of application No. PCT/CN2016/084479, filed on Jun. 2, 2016.

(30) Foreign Application Priority Data

Dec. 17, 2015  (CN) .......................... 2015 1 0946978

(51) Int. Cl.
*G06F 12/00* (2006.01)
*G06F 3/06* (2006.01)
(Continued)

(52) U.S. Cl.
CPC .............. *G06F 3/06* (2013.01); *G06F 3/064* (2013.01); *G06F 3/0608* (2013.01);
(Continued)

(58) Field of Classification Search
None
See application file for complete search history.

(56) References Cited

U.S. PATENT DOCUMENTS 9,015,559 B2* 4/2015 Shalvi .................... G06F 11/14
                                                    714/773
9,632,702 B2* 4/2017 Song ..................... G06F 3/0607
(Continued)

FOREIGN PATENT DOCUMENTS

CN        102053802        5/2011
CN        103713853        4/2014
(Continued)

OTHER PUBLICATIONS

International Search Report in PCT Application No. PCT/CN2016/084479, dated Sep. 14, 2016 in 2 pages.

*Primary Examiner* — John A Lane
(74) *Attorney, Agent, or Firm* — Knobbe Martens Olson & Bear LLP (57) ABSTRACT

A storage management method and a storage management apparatus are provided. In some embodiments, the method includes: detecting, during a preset length of time, a writing amount per time unit of service data of a target network service in a target storage; retrieving a correspondence relationship between the writing amount per time unit and an amount of a redundant storage, wherein the relationship indicates the amount of the redundant storage increases with the increasing of the writing amount per time unit; determining a first amount of the redundant storage corresponding to the first writing amount per time unit according to the correspondence relationship; and configuring the redundant storage for the target network service in accordance with the first amount of the redundant storage.

18 Claims, 4 Drawing Sheets

(51) Int. Cl.
*G06F 12/02* (2006.01)
*G06F 12/0873* (2016.01)

(52) U.S. Cl.
CPC ........ *G06F 3/0679* (2013.01); *G06F 12/0238* (2013.01); *G06F 12/0873* (2013.01); *G06F 2212/222* (2013.01)

(56) References Cited

U.S. PATENT DOCUMENTS

| | | |
|---|---|---|
| 2011/0099320 A1 | 4/2011 | Lucas et al. |
| 2011/0202578 A1 | 8/2011 | Asano et al. |
| 2012/0303873 A1 | 11/2012 | Nguyen et al. |
| 2013/0318283 A1 | 11/2013 | Small et al. |
| 2014/0075100 A1 | 3/2014 | Kaneko et al. |
| 2014/0095763 A1 | 4/2014 | Ash et al. |
| 2014/0095787 A1 | 4/2014 | Ash et al. |
| 2014/0240335 A1 | 8/2014 | Hu et al. |

FOREIGN PATENT DOCUMENTS

| | | |
|---|---|---|
| JP | 2005-242897 A | 9/2005 |
| JP | 2008-171103 A | 7/2008 |
| JP | 2011-192260 A | 9/2011 |
| JP | 2014-056408 A | 3/2014 |
| JP | 2014-519112 A | 8/2014 |
| JP | 2015-518987 A | 7/2015 |

\* cited by examiner

METHOD AND APPARATUS FOR MANAGING STORAGE DEVICE

This application is a continuation of International Patent Application No. PCT/CN2016/084479 filed on Jun. 2, 2016, which claims priority to Chinese Patent Application No. 201510946978.1, titled "METHOD AND APPARATUS FOR MANAGING STORAGE DEVICE", filed with the Chinese State Intellectual Property Office on Dec. 17, 2015, both of which are incorporated herein by reference in their entireties.

TECHNICAL FIELD

The disclosure relates to the technical field of computers, and particularly to a storage management method and a storage management apparatus.

BACKGROUND

With the development of the computer technology and the internet technology, storages with large storage capacities are widely used on the network side. The solid state disks become the best choice for network service storages due to properties of fast read speed, low power consumption, and the like.

In the conventional technology, the technician set a basic storage and a redundant storage in the storage for each network service.

In the research, it is found that the conventional technology has at least the following problems.

The basic storage and the redundant storage of the solid state disk assigned to each network service have fixed capacities. Therefore, for the network service with a large amount of traffic, the storage of the solid state disk is easily filled, resulting in a high frequency of invalid data cleaning. The cleaning process may damage storage blocks of the solid state disk to a certain degree, which reduces the service life of the target storage.

SUMMARY

In order to solve the problem in the conventional technology, a storage management method and a storage management apparatus are provided according to the embodiments of the present disclosure.

According to an aspect of the present disclosure, a storage management method is provided. The method includes: detecting, during a preset length of time, a first writing amount per time unit of service data of a target network service in a target storage; determining a first amount of the redundant storage corresponding to the first writing amount per time unit according to a prestored correspondence between a writing amount per time unit and an amount of a redundant storage, where, in the correspondence, the amount of the redundant storage increases with increase of the writing amount per time unit; and configuring the redundant storage for the target network service in accordance with the first amount of the redundant storage.

According to another aspect of the present disclosure, a storage management apparatus is provided. The apparatus includes: a detecting module configured to detect, during a preset length of time, a first writing amount per time unit of service data of a target network service in a target storage; a determining module configured to determine a first amount of the redundant storage corresponding to the first writing amount per time unit according to a prestored correspondence between a writing amount per time unit and an amount of a redundant storage, where the amount of the redundant storage increases with increase of the writing amount per time unit; and a setting module configured to configure the redundant storage for the target network service in accordance with the first amount of the redundant storage.

According to another aspect of the present disclosure, it is provided a computer-readable storage medium, in which program instructions for performing the method are stored.

According to the embodiments of the disclosure, the amount of the redundant storage may be dynamically adjusted based on the writing amount per time unit of the service data of the target network service. Hence, when the writing amount per time unit increases, the amount of the redundant storage may be automatically increased to reduce the frequency of data cleaning, thereby prolonging the service life of the target storage.

BRIEF DESCRIPTION OF THE DRAWINGS

In order to more clearly illustrate technical solutions of the embodiments of the present disclosure, accompanying drawings to be used in the description of the embodiments are briefly described below. The accompanying drawings in the following description illustrate some embodiments of the present disclosure, and other drawings may be obtained by those skilled in the art according to the accompanying drawings provided herein.

DETAILED DESCRIPTION OF THE EMBODIMENTS

The objects, technical solutions and advantages of the present disclosure will become more apparent from the following description of embodiments of the present disclosure made with reference to the accompanying drawings.

First Embodiment

A storage management method is provided according to the embodiment of the present disclosure, which is executed by a storage management device. The storage management device may be a server, and may be provided with a processor, a memory, a transceiver and the like. The processor may be used for processing the storage management. The memory may be used for storing data required for the processing and data generated in the processing. The transceiver may be used for receiving and transmitting data.

Figure 1:
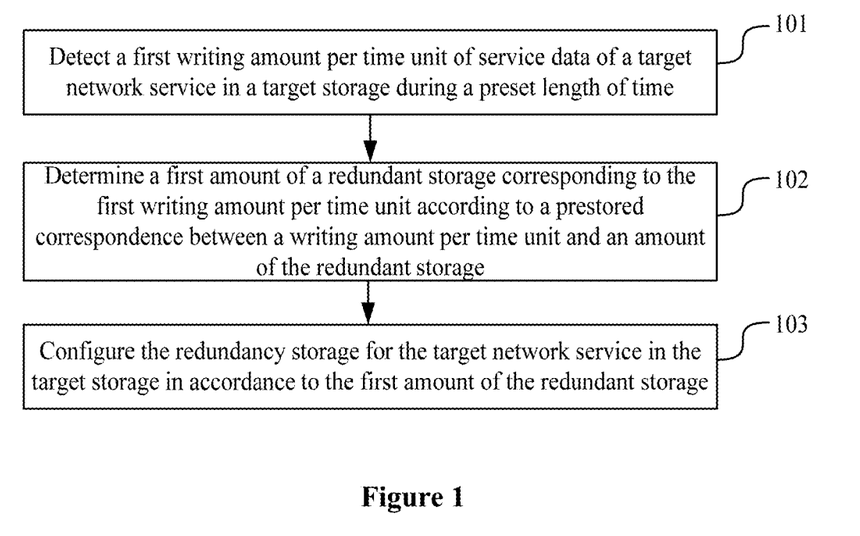
FIG. 1 is a flow chart of a storage management method according to an embodiment of the present disclosure.

Referring to FIG. 1, a processing flow of the method may include the steps 101 to 103.

In step 101, a first writing amount per time unit of service data of a target network service in a target storage is detected during a preset length of time.

The target storage may provide storage spaces for service data of multiple network services. The target storage may be a solid state disk. The target network service may be a service of an application, such as the service of WeChat application, the service of DiDi Taxi application, which may be installed on the storage management device or another server device.

As an example, the storage management device can continuously detect the writing amount of the service data of the target network service in the target storage. The storage management device determines the writing amount of the service data of the target network service in the target storage during the predetermined time period at the interval of the predetermined time period, to obtain the first writing amount per time unit of the service data of the target network service in the target storage.

The writing amount per time unit may be an amount of data written per time unit. For example, the data amount of the service data of the target network service written in the target storage per minute is 200M, or the data amount of the service data of the target network service written in the target storage per minute is 1 G.

For example, regarding the WeChat application, the service data of the WeChat application needs to be stored in the target storage. Here it is assumed that the predetermined time period is 10 minutes, and the storage management device detects that the amount of the service data written in the target storage in past 10 minutes is 200M. Therefore, it can be determined that the first writing amount per time unit of the service data of the WeChat application is 20M.

Optionally, the writing amount per time unit may also be the number of writes per time unit. For example, the number of writes of the target network service in the target storage per minute is 200,000, or the number of writes of the target network service in the target storage per minute is 500,000.

In step 102, a first amount of the redundant storage corresponding to the first writing amount per time unit is determined according to a prestored correspondence between the writing amount per time unit and an amount of a redundant storage.

Here, the amount of the redundant storage includes a redundant storage capacity or a ratio of a redundant storage capacity to a basic storage capacity of the target network service in the target storage.

Here, the amount of the redundant storage may be a storage capacity other than a fixed storage capacity (also referred to as a basic storage capacity) provided by the target storage for the target network service, and may be referred to as the redundant storage capacity. For example, a fixed storage capacity of 1 T is provided by the target storage for the target network service, and a storage capacity of 100 G is additionally provided for the target network service as the amount of the redundant storage for the target network service.

Alternatively, the amount of the redundant storage may be the ratio of the storage capacity additionally provided by the target storage to the basic storage capacity of the target network service in the target storage. For example, in a case that the basic storage capacity provided by the target storage for the target network service is 10 T and the storage capacity additionally provided for the target network service is 1 T, the amount of the redundant storage is 10%.

A correspondence between the writing amount per time unit and the amount of the redundant storage may be stored in the storage management device. In the correspondence, the amount of the redundant storage may increase with increase of the writing amount per time unit. In this way, when the writing amount per time unit of the target network service increases, the amount of the redundant storage is increased dynamically, thereby delaying the data cleaning and increasing the proportion of the invalid data (also referred to as dirty data) cleaned during the data cleaning. Therefore, write amplification may be reduced.

As an example, Table 1 illustrates a correspondence between the writing amount per time unit and the amount of the redundant storage, where the amount of data written per time unit is used as the writing amount per time unit, and the redundant storage capacity is used as the amount of the redundant storage. As shown in Table 1, the redundant storage capacity corresponding to the writing amount per time unit may be determined according to a value section to which the writing amount per time unit belongs. It should be understood that the provided correspondence is only an example, and those skilled in the art can modify the correspondence according to the actual requirement.

TABLE 1

| Writing amount per time unit | Amount of redundant storage |
|---|---|
| 0-300M | 200M |
| 300-600M | 500M |
| . . . | . . . |

As an example, after determining the first writing amount per time unit of the service data of the target network service, the storage management device may determine the value section of the writing amount per time unit to which the first time unit belongs as a first value section. Then, the first amount of the redundant storage corresponding to the first value section may be determined according to the correspondence between the writing amount per time unit and the amount of the redundant storage. For example, in a case where the target network service is the service of the WeChat application, and the storage management device determines the first writing amount per time unit to be 500M, the first value section to which the first writing amount per time unit of 500M belongs may be determined to be 300M-600M, then the first amount of the redundant storage corresponding to the first value section of 300M-600M may be searched for and determined to be 500M, based on which the amount of the redundant storage is set. In this way, in a case where the first writing amount per time unit is great, the amount of the redundant storage may be set to be great, thereby delaying the data cleaning and increasing the proportion of the invalid data cleaned during the data cleaning.

Table 2 illustrates another correspondence between the writing amount per time unit and the amount of the redundant storage, where the amount of data written per time unit is used as the writing amount per time unit, and the ratio of the redundant storage capacity to the basic storage capacity of the target network service in the target storage is used as the amount of the redundant storage. In Table 2, the predetermined value section of the writing amount per time unit corresponds to the amount of the redundant storage. It should be understood that the provided correspondence is only an example, and those skilled in the art can modify the correspondence according to the actual requirement.

TABLE 2

| Writing amount per time unit | Amount of redundant storage |
|---|---|
| 0-300M | 10% |
| 300-600M | 20% |
| ... | ... |

Alternatively, the first amount of the redundant storage may be determined according to the basic storage capacity and the writing amount per time unit of the target network service in the target storage. The corresponding processing may include: detecting a basic storage capacity of the target network service in the target storage, and determining the first amount of the redundant storage corresponding to the basic storage capacity and the first writing amount per time unit of the target network service in the target storage according to a prestored correspondence between the basic storage capacity, the writing amount per time unit and the amount of the redundant storage.

As an example, the correspondence between the basic storage capacity, the writing amount per time unit and the amount of the redundant storage may be stored in the storage management device, as shown in Table 3. Table 3 illustrates the correspondence between the writing amount per time unit, the basic storage capacity and the amount of the redundant storage. For the writing amount per time unit in a determined value section, the amount of the redundant storage may be set differently based on different basic storage capacities. As another example, for a same basic storage capacity, the amount of the redundant storage may be set differently based on different writing amounts per time unit. It should be understood that the correspondence provided in Table 3 is only an example, and those skilled in the art can modify the correspondence according to the actual requirement.

TABLE 3

| Writing amount per time unit | Basic storage capacity | Amount of redundant storage |
|---|---|---|
| 0-300M | 1 T | 500M |
|  | ... | ... |
| 300-600M | 10 T | 1 T |
|  | ... | ... |
| ... | ... | ... |

The storage management device detects the first writing amount per time unit of the service data of the target network service in the target storage and determines the basic storage capacity of the target network service in the target storage. Then, the storage management device may determine the first amount of the redundant storage corresponding to the basic storage capacity and the first writing amount per time unit of the target network service in the target storage according to the prestored correspondence between the basic storage capacity, the writing amount per time unit and the amount of the redundant storage. For example, in a case where the target network service is the service of the WeChat application, and the storage management device determines the first writing amount per time unit to be 500M, and determines that the basic storage capacity provided by the target storage for the target network service is 10 T, the amount of the redundant storage corresponding to the basic storage capacity of 10 T and the first writing amount per time unit of 500M is searched for and determined to be 1 T, and thus the first amount of the redundant storage may be determined to be 1 T.

In step 103, the redundant storage for the target network service is configured in accordance with the first amount of the redundant storage.

As an example, after determining the first amount of the redundant storage, the storage management device may set the amount of the redundant storage of the target network service in the target storage as the first amount of the redundant storage.

In the embodiment of the present disclosure, a data cleaning threshold may be determined according to the writing amount per time unit. The corresponding processing may include: determining a first data cleaning threshold corresponding to the first writing amount per time unit according to a prestored correspondence between the writing amount per time unit and the data cleaning threshold, where the data cleaning threshold is a total data amount of the target network service in the target storage used for triggering the target storage to perform invalid data cleaning on the target network service; and setting the data cleaning threshold of the target network service in the target storage as the first data cleaning threshold.

As an example, the data cleaning threshold may also be referred to as a garbage reclamation threshold, which may be the service data amount of the target network service stored in the target storage at which the target storage cleans invalid data of the target network service.

The correspondence between the writing amount per time unit and the data cleaning threshold may be stored in the storage management device. A greater writing amount per time unit of the service data of the target network service corresponds to a smaller data cleaning threshold, thereby ensuring that the target storage has enough spaces for writing the service data of the target network service. The correspondence between the writing amount per time unit and the data cleaning threshold is shown in Table 4. As an example, Table 4 illustrates a correspondence between the writing amount per time unit and the data cleaning threshold, where the amount of data written per time unit is used as the writing amount per time unit. As shown in Table 4, the data cleaning threshold corresponding to the writing data amount per time unit may be determined according to the value section to which the writing amount per time unit belongs. It should be understood that the provided correspondence is only an example, and those skilled in the art can modify the correspondence according to the actual requirement.

TABLE 4

| Writing amount per time unit | Data cleaning threshold |
|---|---|
| 0-300M | 97 T |
| 300-600M | 95 T |
| ... | ... |

As an example, after determining the first writing amount per time unit, the storage management device may determine the first data cleaning threshold according to the correspondence between the writing amount per time unit and the data cleaning threshold, and set the data cleaning threshold of the target network service in the target storage as the first data cleaning threshold. For example, in a case where the basic storage capacity provided by the target storage for the WeChat application is 100 T, when detecting that the first writing amount per time unit of the WeChat application is 500M, the storage management device may determine that the first writing amount per time unit belongs to the value section of 300-600M, and may search for the garbage reclamation threshold corresponding to the value section of 300-600M and determine it to be 95 T, and then set the data cleaning threshold of the WeChat application in the target storage to be 95 T. That is, in a case where the data amount of the service data of the WeChat application in the target storage is 95 T, the target storage may be triggered to clean the service data of the WeChat application.

In Table 1 to Table 4, the amount of data written per time unit is used as the writing amount per time unit. It should be understood by those skilled in the art that the number of writes per time unit may be used as the writing amount per time unit for determining the amount of the redundant storage.

In the embodiment of the present disclosure, the invalid data threshold may also be determined based on the amount of the redundant storage. The corresponding processing may include: determining a first invalid data threshold corresponding to the first amount of the redundant storage according to a prestored correspondence between the amount of the redundant storage and the invalid data threshold, where the invalid data threshold is a ratio of an invalid data amount to a total data amount of the target network service in the target storage used for triggering the target storage to perform invalid data cleaning on the target network service; and setting the invalid data threshold of the target network service in the target storage as the first invalid data threshold.

As an example, the invalid data threshold may also be referred to as a dirty data threshold, which may be the ratio of the invalid data amount to the total data amount of the target network service in the target storage at which the target storage performs invalid data cleaning on the target network service.

The correspondence between the amount of the redundant storage and the invalid data threshold may be stored in the storage management device. In the correspondence, a greater redundant storage corresponds to a greater invalid data threshold. Therefore, the data cleaning may be performed at a greater amount of invalid data, in which case the amount of valid data which needs to be copied is small, thereby reducing write amplification, as shown in Table 5. In Table 5, the redundant storage capacity is used as the amount of the redundant storage.

TABLE 5

| Amount of redundant storage | Invalid data threshold |
|---|---|
| 50M | 80% |
| 100M | 87% |
| . . . | . . . |

After determining the first amount of the redundant storage of the target network service, the storage management device may determine the first invalid data threshold corresponding to the first amount of the redundant storage according to the correspondence between the amount of the redundant storage and the invalid data threshold, and then set the invalid data threshold of the target network service in the target storage as the first invalid data threshold. In this way, during storage of the service data of the target network service into the target storage, when the ratio of the invalid data amount of the service data to the total data amount of the target network service in the target storage reaches the first invalid data threshold, the target storage is triggered to clean the invalid data of the target network service. As an example, the storage space provided by the target storage for the network service may be divided into multiple storage blocks, and the data may be written in parallel into multiple storage blocks. The block where the invalid data proportion is relatively great may be cleaned first when performing the invalid data cleaning.

According to the embodiment of the present disclosure, a process of storing the service data of the target network service is further provided, which may include the following process.

Figure 2:
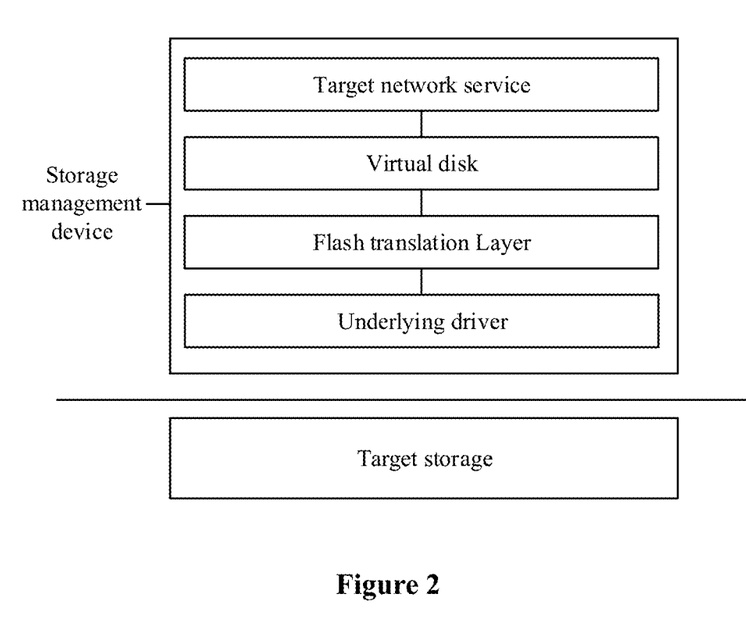
FIG. 2 is a schematic diagram showing a constitution of a storage management device and a relationship between the storage management device and a target storage according to an embodiment of the present disclosure.

As shown in FIG. 2, the target network service may be installed on the storage management device or other server device. The storage management device may be provided with a virtual disk, a flash translation layer, an underlying driver and the like. The virtual disk may be used for providing the a logic storage space to the service data of the target network service, the flash translation layer may be used for storing the correspondence needed in storing the service data of the target network service (for example, the correspondence between the writing amount per time unit and the amount of the redundant storage), and the underlying driver may be used for driving the target storage.

Figure 3:
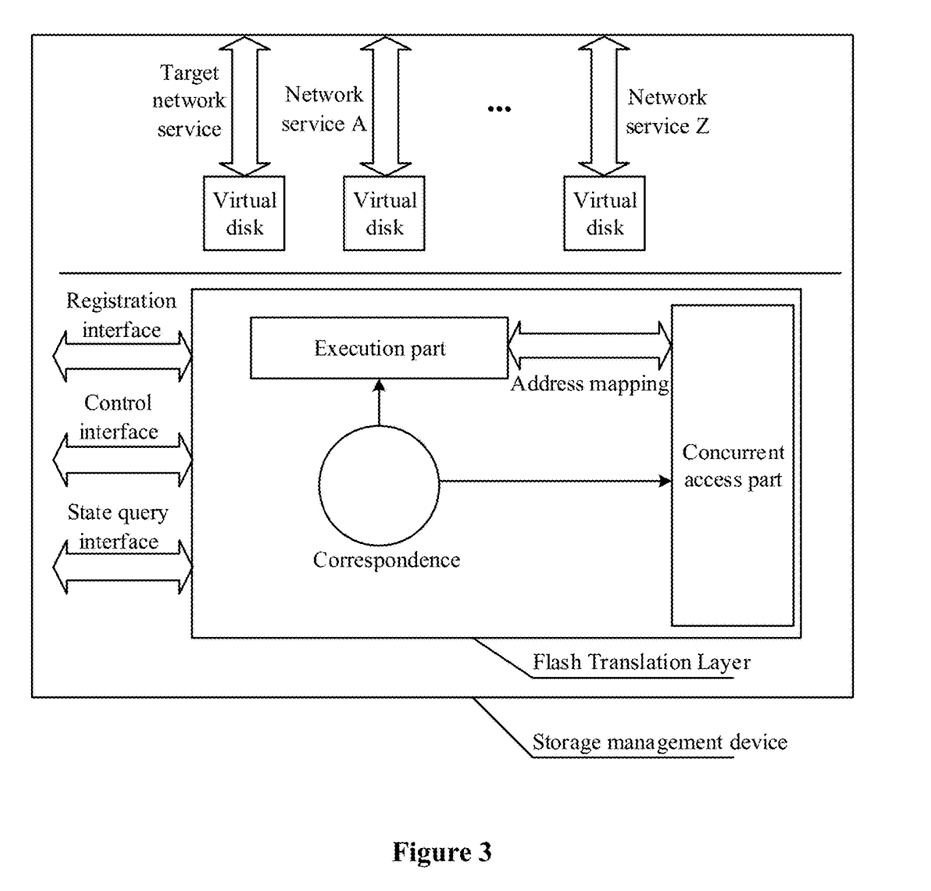
FIG. 3 is a schematic diagram showing a functional structure of a storage management device according to an embodiment of the present disclosure.

As shown in the FIG. 3, multiple network services (such as the target network service, a network service A and the like) may be installed in a storage management device, or the multiple network services are installed in different server devices, but share the flash translation layer of the storage management device and share one target storage. Each network service corresponds to a virtual disk, and the number of the virtual disks may be determined by the writing amount per time unit. The number of the virtual disks may be in direct proportion to the writing amount per time unit. The technician may set the correspondence of the writing amount per time unit with the corresponding amount of the redundant storage, the data cleaning threshold, and the like according to an experience value. The correspondence may be stored into the flash translation layer. Also, a registration interface, a control interface and a state querying interface may be provided in the flash translation layer, where the registration interface may be used for querying the amount of the redundant storage and the data cleaning threshold corresponding to the writing amount per time unit by the network service, the control interface may be used for determining the number of the virtual disks according to the writing amount per time unit, and the state query interface may be used for detecting the writing amount per time unit of the network service. In addition, an execution part and a concurrent access part may be provided in the flash translation layer. The execution part may be used for determining an address mapping relationship, that is, the mapping relationship between the logical address of the storage address recorded by the network service and the physical address of the storage address recorded by the target storage. The concurrent access part may be used for accessing in parallel the multiple storage blocks of the target storage. The storage space provided by the target storage for the network service may be divided into multiple storage blocks, and data may be written in parallel into the multiple storage blocks during the data writing.

When the service data of the target network service is stored into the target storage, the writing amount per time unit of the target network service during the predetermined time period may be detected, and the amount of the redundant storage and the data cleaning threshold corresponding to the writing amount per time unit may be determined based on the writing amount per time unit. Then, the service data is transmitted to the virtual disk, which may transmit the service data to the flash translation layer. The execution part may receive the service data and determine the mapping relationship between the logical address and the physical address of the service data. Then, the concurrent access part may store the service data into a corresponding storage block in the target storage according to the address mapping relationship through the underlying driver.

In addition, in a case where the storage management device controls the service data of the target network service to be stored in the target storage, the service data may be stored according to priority, that is, the current service data having a higher priority may be written first, and after the service data is written, other service data is written.

In the embodiment of the present disclosure, the first writing amount per time unit of the service data of the target network service in the target storage during the predetermined time period is detected, the first amount of the redundant storage corresponding to the first writing amount per time unit is determined according to the prestored correspondence between the writing amount per time unit and the amount of the redundant storage, and the redundant storage of the target network service in the target storage is set according to the first amount of the redundant storage. In this way, when the writing amount per time unit increases, the amount of the redundant storage may be increased automatically to reduce the frequency of the data cleaning, thereby prolonging the service life of the target storage.

Second Embodiment

Based on the same technical idea, it is further provided a storage management apparatus according to the embodiment of the present disclosure. As shown in the FIG. 4, the apparatus includes a detecting module 410, a determining module 420 and a setting module 430.

Figure 4:
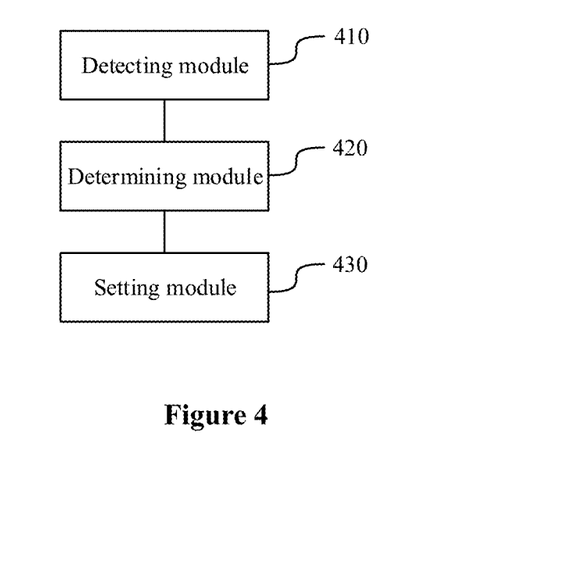
FIG. 4 is a schematic structural diagram of a storage management apparatus according to an embodiment of the present disclosure.

The detecting module 410 is configured to detect, during a preset length of time, a first writing amount per time unit of service data of a target network service in a target storage.

The determining module 420 is configured to determine a first amount of the redundant storage corresponding to the first writing amount per time unit according to a prestored correspondence between a writing amount per time unit and an amount of a redundant storage. In the correspondence, the amount of the redundant storage increases with increase of the writing amount per time unit.

The setting module 430 is configured to configure the redundant storage for the target network service in accordance with the first amount of the redundant storage.

Optionally, the writing amount per time unit includes the number of writes per time unit or an amount of data written per time unit.

Optionally, the amount of the redundant storage includes a redundant storage capacity or a ratio of a redundant storage capacity to a basic storage capacity of the target network service in the target storage.

Optionally, the determining module 420 is further configured to determine a first data cleaning threshold corresponding to the first writing amount per time unit according to a prestored correspondence between the writing amount per time unit and a data cleaning threshold. The data cleaning threshold is a total data amount of the target network service in the target storage used for triggering the target storage to perform invalid data cleaning on the target network service.

The setting module 430 is further configured to set the data cleaning threshold of the target network service in the target storage as the first data cleaning threshold.

Optionally, the determining module 420 is further configured to determine a first invalid data threshold corresponding to the first amount of the redundant storage according to a prestored correspondence between the amount of the redundant storage and an invalid data threshold. The invalid data threshold is a ratio of an invalid data amount to a total data amount of the target network service in the target storage used for triggering the target storage to perform the invalid data cleaning on the target network service.

The setting module 430 is further configured to set the invalid data threshold of the target network service in the target storage as the first invalid data threshold.

Figure 5:
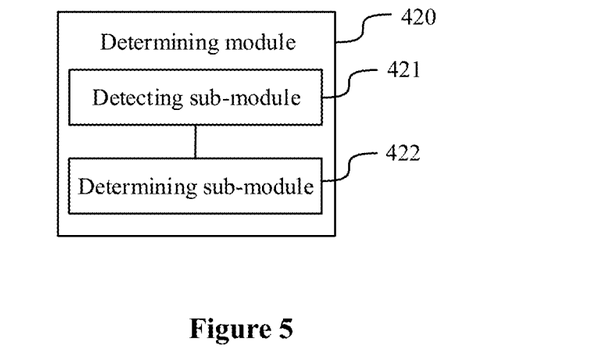
FIG. 5 is a schematic diagram of a determining module of the storage management apparatus according to an embodiment of the present disclosure.

As an example, as shown in FIG. 5, the determining module 420 described with reference to FIG. 4 may include a detecting sub-module 421 and a determining sub-module 422.

The detecting sub-module 421 is configured to detect the basic storage capacity of the target network service in the target storage.

The determining sub module 422 is configured to determine the first amount of the redundant storage corresponding to the basic storage capacity and the first writing amount per time unit of the target network service in the target storage according to a prestored correspondence between the basic storage capacity, the writing amount per time unit and the amount of the redundant storage.

In the embodiment of the present disclosure, the first writing amount per time unit of the service data of the target network service in the target storage during the predetermined time period is detected; the first amount of the redundant storage corresponding to the first writing amount per time unit is determined according to the prestored correspondence between the writing amount per time unit and the amount of the redundant storage, where, in the correspondence, the amount of the redundant storage increases with increase of the writing amount per time unit; and the redundant storage of the target network service in the target storage is set according to the first amount of the redundant storage. In this way, when the writing amount per time unit increases, the amount of the redundant storage may be increased automatically to reduce the frequency of the data cleaning, thereby prolonging the service life of the target storage.

It should be noted that the storage management process of the storage management apparatus provided according to the above embodiment is exemplified by the division of the above-described functional modules. In practice, it is possible to allocate the above functions to different function modules, that is, the internal structure of the storage management apparatus is divided into different functional modules to implement all or part of the functions described above. In addition, the storage management apparatus and the storage management method provided according to the above embodiments belong to the same concept, and for the specific implementation process of the storage management apparatus, one may refer to the method embodiment, which is not repeated here.

Third Embodiment

Figure 6:
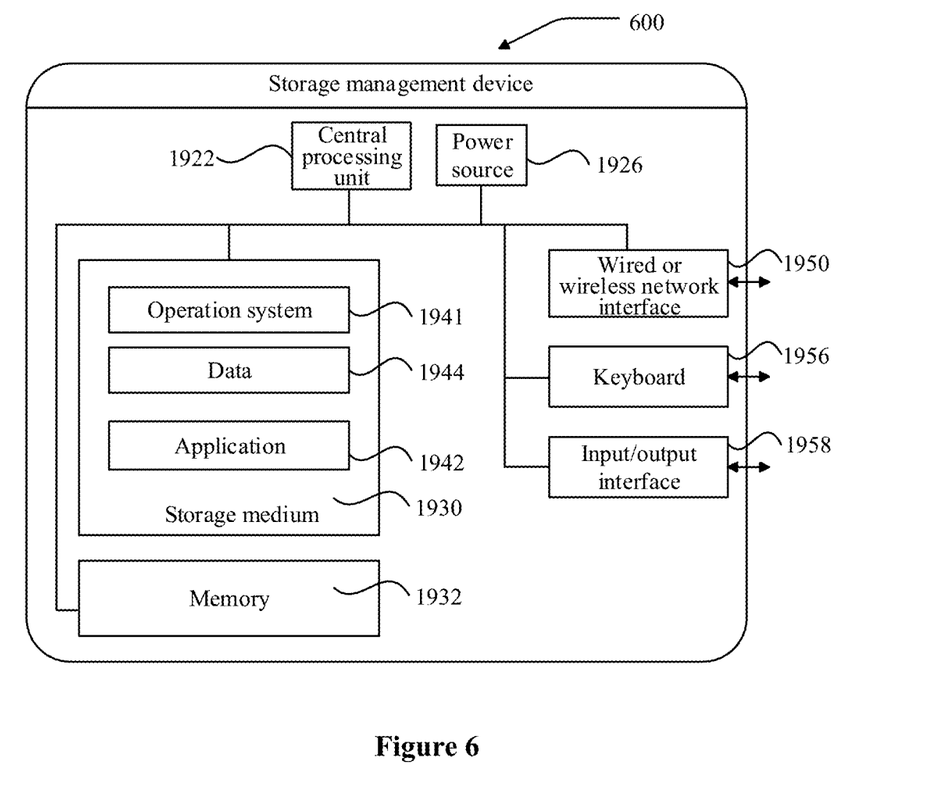
FIG. 6 is a schematic structural diagram showing hardware of the storage management device according to an embodiment of the present disclosure.

Reference is made to FIG. 6, which illustrates the schematic structural diagram of hardware of the storage management device provided according to an embodiment of the present disclosure. The storage management device may be configured to implement the storage management method according to the above embodiment.

The storage management device may be configured as a task execution server 600 shown in FIG. 6. The task execution server 600 may have different configurations and performances, which may include one or more central processors 1922 (such as one or more processors), a memory 1932, and one or more storage mediums 1930 (such as one or more mass storages) for storing an application 1942 or data 1944. The memory 1932 and the storage medium 1930 may be temporary storages or lasting storages. The program stored in the storage medium 1930 may include one or more modules (not shown in the figure), and each module may include a series of instructions of the task execution server. Furthermore, the central processing unit 1922 may be configured to communicate with the storage medium 1930 and execute a series of instructions in the medium 1930 on the task execution server 600.

The task execution server 600 may further include one or more power sources 1926, one or more wired or wireless network interfaces 1950, one or more input-output interfaces 1958, one or more keyboards 1956, and/or one or more operation systems 1941, such as Windows Server™, 5 Mac OS X™, Unix™, Linux™, FreeBSD™. The task execution server 600 may include a storage, and one or more programs, where the one or more programs are stored in the storage, and are configured such that the one or more processors execute the instructions contained in the one or more programs for executing the above described storage management method.

It can be understood by those skilled in the art that all or some of steps in the methods according to the above embodiments may be implemented by hardware or hardware instructed by a program. The program may be stored in a computer-readable storage medium, which may be a read-only memory, a magnetic disk or an optical disk.

It should be noted that the description above is not intended to limit the disclosure. Any modifications, equivalent substitutions, improvements, and the like within the spirit and principles of the present disclosure are intended to be included in the scope of the present disclosure.

The invention claimed is:

1. A storage management method, comprising:
by a device comprising one or more processors and a memory:
detecting, during a preset length of time, a first writing amount per time unit of service data of a target network service in a target storage;
retrieving a correspondence relationship between the first writing amount per time unit and an amount of a redundant storage, wherein the relationship indicates that the amount of the redundant storage increases with the increasing of the first writing amount per time unit;
determining a first amount of the redundant storage corresponding to the first writing amount per time unit according to the correspondence relationship; and
configuring the redundant storage for the target network service in accordance with the first amount of the redundant storage.

2. The storage management method according to claim 1, wherein the first writing amount per time unit comprises the number of writes per time unit or an amount of data written per time unit.

3. The storage management method according to claim 1, wherein the amount of the redundant storage comprises a redundant storage capacity or a ratio of a redundant storage capacity to a basic storage capacity of the target network service in the target storage.

4. The storage management method according to claim 1, wherein retrieving the correspondence relationship between the first writing amount per time unit and the amount of a redundant storage and determining the first amount of the redundant storage corresponding to the first writing amount per time unit according to the correspondence relationship comprises:
detecting a basic storage capacity of the target network service in the target storage;
retrieving a correspondence relationship between the basic storage capacity, the first writing amount per time unit and the amount of the redundant storage;
determining the first amount of the redundant storage corresponding to the basic storage capacity and the first writing amount per time unit according to the correspondence relationship.

5. The storage management method according to claim 1, further comprising:
retrieving a correspondence relationship between the first writing amount per time unit and a data cleaning threshold, wherein the data cleaning threshold is a total data amount of the target network service in the target storage used for triggering the target storage to perform invalid data cleaning on the target network service;
determining a first data cleaning threshold corresponding to the first writing amount per time unit according to the corresponding relationship; and
setting the data cleaning threshold of the target network service in the target storage as the first data cleaning threshold.

6. The storage management method according to claim 1, further comprising:
retrieving a correspondence relationship between the amount of the redundant storage and an invalid data threshold, wherein the invalid data threshold is a ratio of an invalid data amount to a total data amount of the target network service in the target storage used for triggering the target storage to perform invalid data cleaning on the target network service;
determining a first invalid data threshold corresponding to the first amount of the redundant storage according to the correspondence relationship; and
setting the invalid data threshold of the target network service in the target storage as the first invalid data threshold.

7. A storage management apparatus, comprising one or more processors and a memory for storing program instructions, wherein the one or more processors are configured to execute the program instructions to:
detect, during a preset length of time, a first writing amount per time unit of service data of a target network service in a target storage;
retrieve a correspondence relationship between the first writing amount per time unit and an amount of a redundant storage, wherein the relationship indicates that the amount of the redundant storage increases with the increasing of the first writing amount per time unit;
determine a first amount of the redundant storage corresponding to the first writing amount per time unit according to the correspondence relationship; and
configure the redundant storage for the target network service in accordance with the first amount of the redundant storage.

8. The storage management apparatus according to claim 7, wherein the first writing amount per time unit comprises the number of writes per time unit or an amount of data written per time unit.

9. The storage management apparatus according to claim 7, wherein the amount of the redundant storage comprises a redundant storage capacity or a ratio of a redundant storage capacity to a basic storage capacity of the target network service in the target storage.

10. The storage management apparatus according to claim 7, wherein the one or more processors are further configured to:
   detect a basic storage capacity of the target network service in the target storage;
   retrieve a correspondence relationship between the basic storage capacity, the first writing amount per time unit and the amount of the redundant storage;
   determine the first amount of the redundant storage corresponding to the basic storage capacity and the first writing amount per time unit according to the correspondence relationship.

11. The storage management apparatus according to claim 7, wherein the one or more processors are further configured to:
   retrieve a correspondence relationship between the first writing amount per time unit and a data cleaning threshold, wherein the data cleaning threshold is a total data amount of the target network service in the target storage used for triggering the target storage to perform invalid data cleaning on the target network service;
   determine a first data cleaning threshold corresponding to the first writing amount per time unit according to the corresponding relationship; and
   set the data cleaning threshold of the target network service in the target storage as the first data cleaning threshold.

12. The storage management apparatus according to claim 7, wherein the one or more processors are further configured to:
   retrieve a correspondence relationship between the amount of the redundant storage and an invalid data threshold, wherein the invalid data threshold is a ratio of an invalid data amount to a total data amount of the target network service in the target storage used for triggering the target storage to perform invalid data cleaning on the target network service;
   determine a first invalid data threshold corresponding to the first amount of the redundant storage according to the correspondence relationship; and
   set the invalid data threshold of the target network service in the target storage as the first invalid data threshold.

13. A non-transitory computer-readable storage medium on which program instructions are stored, wherein the program instructions when executed by a processor cause the processor to perform the following method:
   detecting, during a preset length of time, a first writing amount per time unit of service data of a target network service in a target storage;
   retrieving a correspondence relationship between the first writing amount per time unit and an amount of a redundant storage, wherein the relationship indicates the amount of the redundant storage increases with the increasing of the first writing amount per time unit;
   determining a first amount of the redundant storage corresponding to the first writing amount per time unit according to the correspondence relationship; and
   configuring the redundant storage for the target network service in accordance with the first amount of the redundant storage.

14. The computer-readable storage medium according to claim 13, wherein the first writing amount per time unit comprises the number of writes per time unit or an amount of data written per time unit.

15. The computer-readable storage medium according to claim 13, wherein the amount of the redundant storage comprises a redundant storage capacity or a ratio of a redundant storage capacity to a basic storage capacity of the target network service in the target storage.

16. The computer-readable storage medium according to claim 13, wherein the method further comprises:
   detecting a basic storage capacity of the target network service in the target storage;
   retrieving a correspondence relationship between the basic storage capacity, the first writing amount per time unit and the amount of the redundant storage;
   determining the first amount of the redundant storage corresponding to the basic storage capacity and the first writing amount per time unit according to the correspondence relationship.

17. The computer-readable storage medium according to claim 13, wherein the method further comprises:
   retrieving a correspondence relationship between the first writing amount per time unit and a data cleaning threshold, wherein the data cleaning threshold is a total data amount of the target network service in the target storage used for triggering the target storage to perform invalid data cleaning on the target network service;
   determining a first data cleaning threshold corresponding to the first writing amount per time unit according to the corresponding relationship; and
   setting the data cleaning threshold of the target network service in the target storage as the first data cleaning threshold.

18. The computer-readable storage medium according to claim 13, wherein the method further comprises:
   retrieving a correspondence relationship between the amount of the redundant storage and an invalid data threshold, wherein the invalid data threshold is a ratio of an invalid data amount to a total data amount of the target network service in the target storage used for triggering the target storage to perform invalid data cleaning on the target network service;
   determining a first invalid data threshold corresponding to the first amount of the redundant storage according to the correspondence relationship; and
   setting the invalid data threshold of the target network service in the target storage as the first invalid data threshold.

* * * * *